United States Patent
Mao et al.

(10) Patent No.: US 10,315,221 B2
(45) Date of Patent: Jun. 11, 2019

(54) VIBRATION MOTOR

(71) Applicants: Lubin Mao, Shenzhen (CN); Hongxing Wang, Shenzhen (CN); Fei Hou, Shenzhen (CN)

(72) Inventors: Lubin Mao, Shenzhen (CN); Hongxing Wang, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 338 days.

(21) Appl. No.: 15/294,952

(22) Filed: Oct. 17, 2016

(65) Prior Publication Data

US 2017/0120298 A1 May 4, 2017

(30) Foreign Application Priority Data

Nov. 3, 2015 (CN) .................... 2015 2 0868815 U

(51) Int. Cl.
*B06B 1/04* (2006.01)
*H02K 33/00* (2006.01)
*H02K 33/16* (2006.01)

(52) U.S. Cl.
CPC ............. *B06B 1/045* (2013.01); *H02K 33/00* (2013.01); *H02K 33/16* (2013.01)

(58) Field of Classification Search
CPC ......... B60B 1/045; H02K 33/16; H02K 33/00
USPC .......................................................... 310/25
See application file for complete search history.

(56) References Cited

U.S. PATENT DOCUMENTS

| 8,283,834 | B2* | 10/2012 | Matsubara | H02N 1/08 310/12.01 |
| 8,878,401 | B2* | 11/2014 | Lee | H02K 33/16 310/15 |
| 10,097,073 | B2* | 10/2018 | Wang | H02K 33/16 |
| 2012/0227269 | A1* | 9/2012 | Subramanian | B26B 19/282 30/210 |
| 2016/0013710 | A1* | 1/2016 | Dong | H02K 33/16 310/25 |
| 2016/0226358 | A1* | 8/2016 | Mao | H02K 33/16 |
| 2016/0226359 | A1* | 8/2016 | Guo | H02K 33/16 |
| 2016/0226360 | A1* | 8/2016 | Wang | H02K 33/16 |
| 2018/0021812 | A1* | 1/2018 | Akanuma | B06B 1/045 310/25 |

* cited by examiner

*Primary Examiner* — Forrest M Phillips
(74) *Attorney, Agent, or Firm* — Na Xu; IPRO, PLLC

(57) ABSTRACT

A vibration motor is provided in the present disclosure. The vibration motor includes a shell providing an accommodating space, a vibrating system accommodated in the accommodating space, a pair of elastic connectors for suspending the vibrating system in the accommodating space, and at least one block member fixed to the shell. The vibrating system includes at least one mass member with a limiting groove, the limiting groove is formed at a surface of the at least one mass member along a direction perpendicular to a vibrating direction of the vibrating system. The at least one block member is partly received in the limiting groove, and a distance between the at least one block member and the at least one mass member is not greater than a maximum vibrating amplitude of the vibrating system.

15 Claims, 4 Drawing Sheets

VIBRATION MOTOR

FIELD OF THE DISCLOSURE

The present disclosure generally relates to vibrator technologies, and more particularly, to a vibration motor applicable to a portable electronic device.

BACKGROUND

With development of mobile communication technologies, portable electronic devices, such as mobile phones, handheld game players, portable multimedia players, or the like, become more and more popular. Portable electronic devices generally include vibration motors for generating tactile feedback.

A typical vibration motor has a thin profile for obtaining a better performance, and includes a vibrator and an elastic member for elastically suspending the vibrator. Moreover, a blocking member is applied in the vibration motor for protecting the vibrator when the vibration motor suffers undesired falling down or collision. However, the blocking member needs to take up some thickness in the vibration motor; this may decrease a width of the elastic member, and therefore, the elastic member may be incapable of satisfying strength requirement of the vibration motor.

Therefore, it is desired to provide a vibration motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
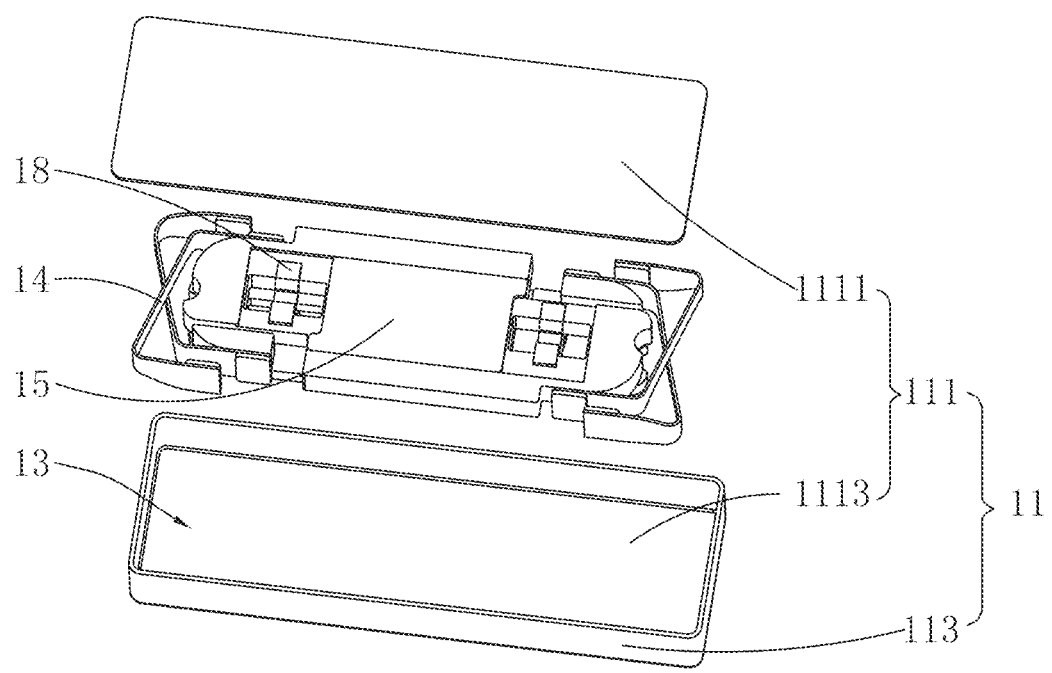
FIG. 1 is a partially exploded view of a vibration motor in accordance with a first embodiment of the present disclosure.

Referring to FIG. 1, a vibration motor 1 according to a first exemplary embodiment of the present disclosure is shown. The vibration motor 1 may be applied in a portable electronic device for providing tactile feedback. The vibration motor includes a shell 11 for providing an accommodating space 13, a vibrating system 15 accommodated in the accommodating space 13, a pair of elastic connectors 14 for elastically suspending the vibrating system 15 in the shell 11, and a plurality of block members 18 connected to the shell 11.

The shell 11 includes a cover 111 and a frame 113; the cover 111 includes a top plate 1111 and a bottom plate 1113 opposite to each other. The top plate 1111 and the bottom plate 1113 are arranged in parallel at two different sides of the vibrating system 15, and cooperate with the frame 113 to form the accommodating space 13. Either the top plate 1111 or the bottom plate 1113 may be integrated to the frame 113 as a one-piece structure; alternatively, the top plate 1111 and the bottom plate 1113 may be separated from the frame 113. In the present embodiment, the bottom plate 1113 and the frame 113 are integrated into one piece, and the top plate 1111 covers the frame 113.

Figure 2:
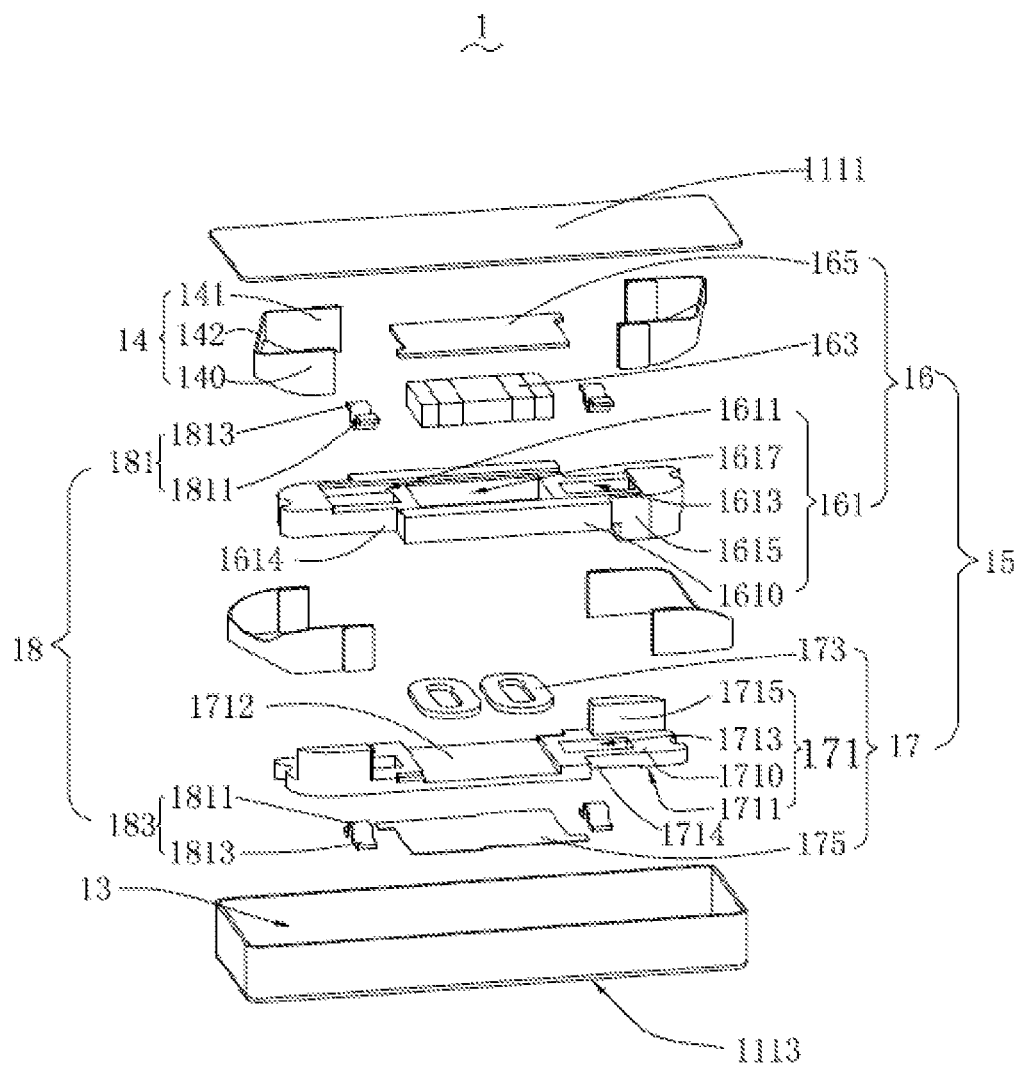
FIG. 2 is an exploded view of the vibration motor in FIG. 1.

Referring also to FIG. 2, the vibrating system 15 includes a first vibrating unit 16 and a second vibrating unit 17 arranged in parallel to each other. The first vibrating unit 16 is located adjacent to the top plate 1111, and the second vibrating unit 17 is located adjacent to the bottom plate 1113. The pair of elastic connectors 14 is configured to elastically suspend the first vibrating unit 16 and the second vibrating unit 17 in the accommodating space 13.

The first vibrating unit 16 includes a first mass member 161, a magnet 163 fixed to the first mass member 161, and a first pole plate 165 arranged between the first mass member 161 and the top plate 1111. The magnet 163 may be a permanent magnet. The first mass member 161 includes a first main body 1610 and a pair of first connecting portions 1615 diagonally formed at two opposite ends of the first main body 1610, the first connecting portions 1615 extending from the first main body 1610 to the second vibrating unit 17, with a magnet receiving hole 1617 formed in a central region of the first main body 1610 and a pair of first limiting grooves 1613 formed on the first main body 1610 and in two opposite sides of the magnet receiving hole 1617.

The first mass member 161 includes the magnet receiving hole 1617 formed in a central region, a pair of first limiting grooves 1613 formed in two opposite sides of the magnet receiving hole 1617, and a pair of first connecting portions 1615 diagonally formed at two opposite ends of the first mass member 161. A surface of the first mass member 161, which faces the top plate 1111, is defined as a first surface 1611. The magnet receiving hole 1617 is a through hole formed at the first surface 1611 and for receiving the magnet 163. The first limiting grooves 1613 may also be through holes which penetrate through the first mass member 161 from the first surface 1611 along a direction perpendicular to a vibrating direction of the first mass member 161; optionally, the first limiting grooves 1613 may alternatively be blind holes. Each of the first connecting portions 1615 may be a protrusion protruding perpendicularly to the first surface 1611 towards the second vibrating unit 17, and is elastically connected to the frame 113 via a respectively one of the pair of elastic connectors 14. For example, each elastic connector 14 may include a first elastic connecting unit having an end fixed to a corresponding one of the first connecting portion 1615, and an opposite end fixed to the frame 113. With this configuration, the first mass member 161 is suspended in the accommodating space 13 via the pair of elastic connectors 14. As shown in FIG. 2, each one of the elastic connectors 14 includes a first fixing arm 140 fixed to the frame, an elastic arm 142 bending and extending from the fixing arm 140, and a second fixing arm 141 extending from the elastic arm 142 and fixed to the mass member 161.

The second vibrating unit 17 includes a second mass member 171, a pair of coils 173 fixed to the second mass member 171, and a second pole plate 175 arranged between the bottom plate 1113 and the second mass member 171. The pair of coils 173 forms a coil assembly and is arranged under the magnet 163. The second mass member 171 comprises a second main body 1710 and a pair of second connecting portions 1715 diagonally formed at two opposite ends of the second main body 1710, the second connecting portions 1715 extending from the second main body 1710 to the first mass member 161, with a coil receiving recess 1712 formed in a central region of the second main body 1710 and a pair of second limiting grooves 1713 formed on the second main body 1710 and in two opposite sides of the second receiving hole 1713, and the first connecting portions 1615 are staggered with the second connecting portions 1715. Specifically, a first notch 1614 running through the first mass member 1610 is formed to receive the second connecting portions 1715, and a second notch 1714 running through the second mass member 1710 is formed to receive the first connecting portions 1615.

The second mass member 171 includes the recess 1712 for receiving the coils 173, a pair of second limiting grooves 1713 formed at two opposite sides of the coils 173, and a pair of second connecting portions 1715 diagonally formed at two opposite ends of the second mass member 171. A surface of the second mass member 171, which faces the bottom plate 1113, is defined as a second surface 1711. The pair of coils 173 is arranged in parallel in the recess 1712. The second limiting grooves 1713 may be through holes, which penetrate through the second mass member 171 from the second surface 1711 along a direction perpendicular to a vibrating direction of the second mass member 171; in other embodiments, the second limiting grooves 1713 may alternatively be blind holes. Each of the second connecting portions 1715 may be a protrusion protruding perpendicularly to the second surface 1711 towards the first mass member 161, and is elastically connected to the frame 113 via a respectively one of the pair of elastic connectors 14. For example, each elastic connector 14 may further include a second elastic connecting unit having an end fixed to a corresponding one of the second connecting portion 1715, and an opposite end fixed to the frame 113. With this configuration, the second mass member 171 is also suspended in the accommodating space 13 via the pair of elastic connectors 14.

The plurality of block members 18 are configured for protecting internal components of the vibration motor 1 in the shell 13 for suffering damage due to falling down or collision. The plurality of block members 18 includes a pair of first block members 171 and a pair of second block member 183. Each of the block members 18 includes a block body 1811 and two fixing parts 1813; the block body 1811 may have a U-shape configuration, and the two fixing parts 1813 extend from two opposite ends of the block body 1811 respectively. In other embodiments, the block members 18 may have other configuration, for example, the block members 18 may alternatively be T-shaped block members or block plates.

Figure 3:
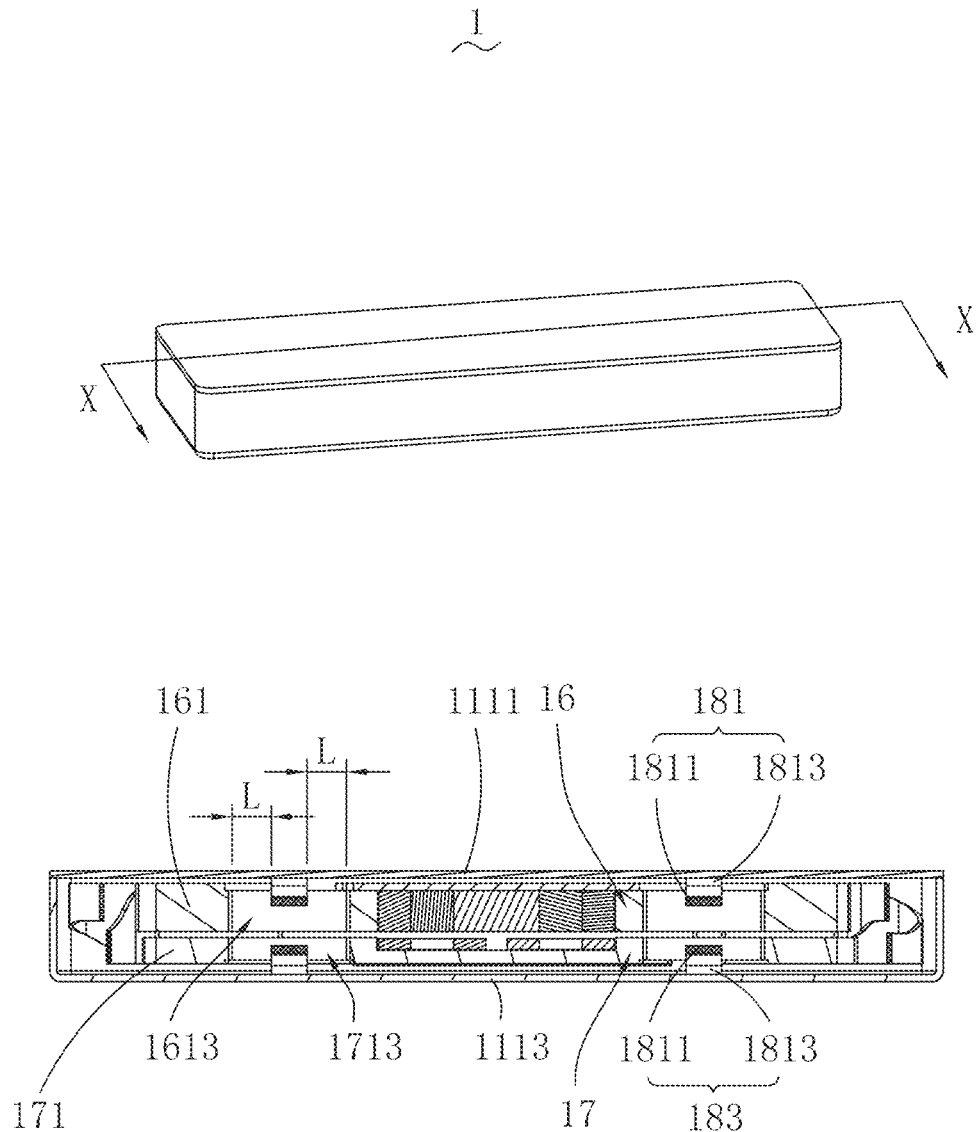
FIG. 3 is a cross-sectional view of the vibration motor of FIG. 1.

Referring also to FIG. 3, each of the first block member 181 corresponds to a respective one of the first limiting groove 1613 in the first mass member 161; the block body 1811 of the first block member 181 is received in the corresponding one of the first limiting groove 1613, and the two fixing part 1813 of the first block member 181 is soldered to the top plate 1111. Moreover, along the vibrating direction of the first vibrating unit 16, a distance between an end of the block body 1811 of the first block member 181 and the first mass member 161 is not greater than maximum deformation of the elastic connectors 14.

Similarly, each of the second block member 183 corresponds to a respective one of the second limiting groove 1713 in the second mass member 171; the block body 1811 of the second block member 183 is received in the corresponding one of the second limiting groove 1713, and the two fixing part 1813 of the second block member 183 is soldered to the bottom plate 1113. Moreover, along the vibrating direction of the second vibrating unit 17, a distance between an end of the block body 1811 of the second block member 183 and the second mass member 171 is not greater than maximum deformation of the elastic connectors 14, namely, a maximum vibrating amplitude of the vibrating system 15.

In operation, the coils 173 receive electric signals, and generate a magnetic force interacting with a magnetic field of the magnet 163, and thus the first vibrating unit 16 and the second vibrating unit 17 of the vibrating system 15 are driven to perform linear vibration in reversed directions. Due to the first limiting grooves 1613 in the first mass member 161 and the second limiting groove 1713 in the second mass member 171, the first block members 181 and the second block members 183 can obtain avoidance spaces corresponding to the maximum vibrating amplitude of the vibrating system 15. As such, the first block members 181 and the second block members 183 can provide effective protection for the vibrating system 15, and stability and reliability of the vibration motor 1 is improved.

Moreover, because the first block members 181 are arranged between the top plate 1111 and the mass member 161, the second block members 183 are arranged between the bottom plate 1113 and the second mass member 171, and the block bodies 1811 thereof are received in the first limiting groove 1613 and the second limiting groove 1713, it is unnecessary for the elastic connectors 14 to reduce a width thereof along a direction perpendicular to the vibrating direction of the vibrating system 15, and in addition, the vibrating range of the vibrating system 15 is limited. Therefore, the stability and reliability of the vibrating system 15 can further be improved, and an anti-collision performance of the vibration motor 1 can also be improved.

Figure 4:
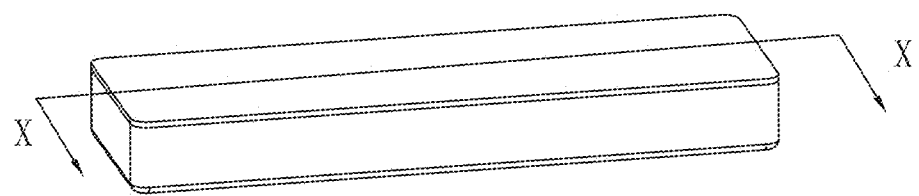
FIG. 4 is a cross-sectional view of a vibration motor in accordance with a second embodiment of the present disclosure.
Figure 4:
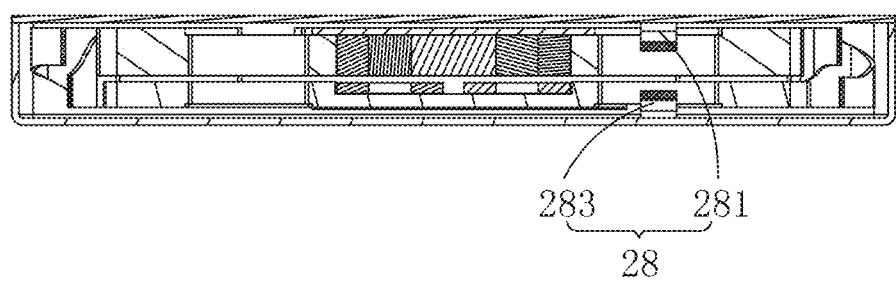

FIG. 4 is a cross-sectional view of a vibration motor according to a second embodiment of the present disclosure. The vibration motor 2 as illustrated in FIG. 4 is similar to the vibration motor 1 as described above, but mainly differs in the number of block members 28. In detail, the block members 28 in the vibration motor 2 merely includes a single first block member 281 and a single second block member 283 for the first vibrating unit and the second vibrating unit 283 respectively. The first block member 281 and the second block member 283 may be arranged at a same side of a magnet and coils; or be arranged at two different sides of the magnet and the coils.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A vibration motor, comprising:
a shell providing an accommodating space;
a vibrating system accommodated in the accommodating space;
a pair of elastic connectors for suspending the vibrating system in the accommodating space; and
at least one block member fixed to the shell;
wherein the vibrating system comprises at least one mass member with a limiting groove, the limiting groove is formed at a surface of the at least one mass member along a direction perpendicular to a vibrating direction of the vibrating system;

wherein the at least one block member is partly received in the limiting groove, and a distance between the at least one block member and the at least one mass member is not greater than a maximum vibrating amplitude of the vibrating system, the at least one block member partially stays inside the limiting groove during a relative motion between the block member and the mass member;

wherein the shell comprises a frame, a top plate and a bottom plate, each of the elastic connecters is connected to the frame and the mass member, the vibrating system comprises a first vibrating unit adjacent to the top plate, and a second vibrating unit adjacent to the bottom plate, the first vibrating unit comprises a first mass member and a magnet received and fixed to the first mass member, and the second vibrating unit comprises a second mass member and a coil assembly arranged in the second mass member and under the magnet, and with the coil interacting with the magnet, the first vibrating unit and the second vibrating unit vibrates in a direction opposite to each other.

2. The vibration motor as described in claim 1, wherein the limiting groove is a through hole penetrating through the at least one mass member from a surface thereof.

3. The vibration motor as described in claim 1, wherein the limiting groove is a blind hole formed at a surface of the at least one mass member.

4. The vibration motor as described in claim 1, wherein at least one block member comprises a block body received in the limiting groove, and two fixing parts extending from two opposite ends of the block body and fixed to the shell.

5. The vibration motor as described in claim 4, the two fixing parts of the at least one block member are fixed to the top plate or the bottom plate.

6. The vibration motor as described in claim 5, wherein the first mass member comprises a pair of first limiting grooves, and the at least one block member comprises a pair of first block members corresponding to the first limiting groove respectively; the block body of the first block member is received in a corresponding one of the first limiting grooves, and the fixing parts of the first block member are fixed to the top plate.

7. The vibration motor as described in claim 6, wherein the second mass member comprises a pair of second limiting grooves, and the at least one block member further comprises a pair of second block members corresponding to the second limiting groove respectively; the block body of the second block member is received in a corresponding one of the second limiting grooves, and the fixing parts of the second block member are fixed to the bottom plate.

8. The vibration motor as described in claim 5, wherein the first mass member comprises a single first limiting groove, and the at least one block member comprises a first block member; the block body of the first block member is received in the first limiting groove, and the fixing parts of the first block member are fixed to the top plate.

9. The vibration motor as described in claim 8, wherein the second mass member comprises a single second limiting groove, and the at least one block member further comprises a second block member; the block body of the second block member is received in the second limiting groove, and the fixing parts of the second block member are fixed to the bottom plate.

10. The vibration motor as described in claim 9, wherein the first block member and the second block member are arranged at a same side of the magnet.

11. The vibration motor as described in claim 9, wherein the first block member and the second block member are arranged at two different sides of the magnet.

12. The vibration motor as described in claim 1, wherein each one of the elastic connectors comprises a first fixing arm fixed to the frame, an elastic arm bending and extending from the fixing arm, and a second fixing arm extending from the elastic arm and fixed to the mass member.

13. The vibration motor as described in claim 1, wherein the first mass member comprises a first main body and a pair of first connecting portions diagonally formed at two opposite ends of the first main body, the first connecting portions extending from the first main body to the second mass member, with a magnet receiving hole formed in a central region of the first main body and a pair of first limiting grooves formed on the first main body and in two opposite sides of the magnet receiving hole.

14. The vibration motor as described in claim 13, wherein the second mass member comprises a second main body and a pair of second connecting portions diagonally formed at two opposite ends of the second main body, the second connecting portions extending from the second main body to the first mass member, with a coil receiving recess formed in a central region of the second main body and a pair of second limiting grooves formed on the second main body and in two opposite sides of the second receiving hole, and the first connecting portions are staggered with the second connecting portions.

15. The vibration motor as described in claim 14, wherein a first notch running through the first mass member is formed to receive the second connecting portions, and a second notch running through the second mass member is formed to receive the first connecting portions.

* * * * *